US006487257B1

(12) United States Patent
Gustafsson et al.

(10) Patent No.: US 6,487,257 B1
(45) Date of Patent: Nov. 26, 2002

(54) SIGNAL NOISE REDUCTION BY TIME-DOMAIN SPECTRAL SUBTRACTION USING FIXED FILTERS

(75) Inventors: Harald Gustafsson, Lund (SE); Ingvar Claesson, Dalby (SE); Sven Nordholm, Kallinge (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/289,554

(22) Filed: Apr. 12, 1999

(51) Int. Cl.[7] .......... H04B 15/00

(52) U.S. Cl. .......... 375/285; 375/354; 375/346; 375/350

(58) Field of Search .......... 375/285, 346, 375/254, 350; 704/226, 225; 381/71.1, 71.11, 71.12, 94.1

(56) References Cited

U.S. PATENT DOCUMENTS

| | | | | |
|---|---|---|---|---|
| 4,630,305 A | | 12/1986 | Borth et al. | 381/94 |
| 4,853,903 A | | 8/1989 | Linville, Jr. et al. | 367/46 |
| 5,680,393 A | * | 10/1997 | Bourmeyster et al. | 37/286 |
| 5,687,243 A | | 11/1997 | McLaughlin et al. | 381/94.3 |

OTHER PUBLICATIONS

S.F. Boll, *Suppression of Acoustic Noise in Speech Using Spectral Subtraction*, IEEE Trans. Accoust. Speech and Sig. Proc., 27:113–120, 1979.

B.S. Morse, *Convolution Theorem, Transfer Functions and Filtering*, "ONLINE!", Oct., 14, 1996, retried from the Internet.

* cited by examiner

*Primary Examiner*—Mohammad H. Ghayour
(74) *Attorney, Agent, or Firm*—Burns, Doane, Swecker & Mathis, L.L.P.

(57) ABSTRACT

For purposes of noise suppression, spectral subtraction filtering is performed in sample-wise fashion in the time domain using a time-domain representation of a spectral subtraction gain function computed in block-wise fashion in the frequency domain. By continuously performing time-domain filtering on a sample by sample basis, the disclosed methods and apparatus avoid block-processing delays associated with frequency-domain based spectral subtraction systems. Consequently, the disclosed methods and apparatus are particularly well suited for applications requiring very short processing delays. In applications where only stationary, low-energy background noise is present, computational complexity is reduced by generating a number of separate spectral subtraction gain functions during an initialization period, each gain function being suitable for one of several predefined classes of input signal (e.g., for one of several predetermined signal energy ranges), and thereafter fixing the several gain functions until the input signal characteristics change.

30 Claims, 4 Drawing Sheets

SIGNAL NOISE REDUCTION BY TIME-DOMAIN SPECTRAL SUBTRACTION USING FIXED FILTERS

RELATED APPLICATIONS

The present application is related to pending U.S. patent application Ser. No. 09/084,387, filed May 27, 1998 and entitled Signal Noise Reduction by Spectral Subtraction using Linear Convolution and Causal Filtering. The present application is also related to pending U.S. patent application Ser. No. 09/084,503, also filed May 27, 1998 and entitled Signal Noise Reduction by Spectral Subtraction using Spectrum Dependent Exponential Gain Function Averaging. Each of the above cited pending patent applications is incorporated herein in its entirety by reference.

FIELD OF THE INVENTION

The present invention relates to communications systems, and more particularly, to methods and apparatus for mitigating the effects of disruptive background noise components in communications signals.

BACKGROUND OF THE INVENTION

Today communications are conducted in a wide variety of potentially disruptive environments, and modern communications solutions are therefore often equipped to compensate for such environments. For example, the microphone in a typical landline or mobile telephone will often pick up not only the voice of the near-end telephone user, but also any surrounding near-end background noise which may be present. This is particularly true in the context of office and automobile handsfree solutions. Since such background noise can be annoying or even intolerable to the far-end user, many of today's telephones are equipped with noise reduction processors which attempt to suppress the background noise while permitting the speaker's voice to pass through without distortion. Such noise reduction processors are often based on the well known technique of spectral subtraction in which the spectral content of a noisy speech signal is analyzed, and those frequency components having poor signal-to-noise ratios are attenuated. See, e.g., S. F. Boll, Suppression of Acoustic Noise in Speech using Spectral Subtraction, *IEEE Trans. Acoust. Speech and Sig. Proc.,* 27:113–120, 1979.

When implementing a noise reduction processor, it is important to minimize any artifacts or delay which might be introduced, as such artifacts and delay can be as bothersome to the far-end user as is the background noise. Accordingly, the above incorporated patent applications disclose spectral subtraction noise reduction systems which introduce low signal distortion as compared to conventional spectral subtraction techniques. Specifically, pending application Ser. No. 09/084,387 discloses a block-based spectral subtraction noise reduction processor in which signal filtering is carried out in the frequency domain using a reduced-variance, reduced-resolution gain function filter. Advantageously, the order of the gain function is chosen such that the frequency-domain filtering corresponds to a true, non-circular convolution in the time domain, and a phase is added to the gain function so that the gain function is causal. As a result, the disclosed noise reduction processor introduces fewer tonal artifacts and fewer inter-block discontinuities as compared to conventional spectral subtraction techniques. Moreover, pending application Ser. No. 09/084,503 discloses techniques for further reducing the variance of the filter gain function and for thereby further reducing the introduction of tonal artifacts. Specifically, the filter gain function is averaged across blocks, for example in dependence upon a measured discrepancy between the spectral density of the noisy speech signal and the spectral density of the noise alone.

While the frequency-domain spectral subtraction filtering techniques of application Ser. Nos. 09/084,387 and 09/084,503 work particularly well in the context of block-based systems (i.e., systems such as the well known Global System for Mobile Communication, or GSM, in which signals are by definition processed sample-block by sample-block), the block-processing times associated with those techniques may not be suitable for applications requiring extremely short signal processor delays. For example, in wire-phone systems, the maximum tolerable signal delay can be as short as 2 ms (corresponding to 16 samples at the standard 8 kHz telephone sampling rate). Consequently, there is a need for improved methods and apparatus for performing noise reduction by spectral subtraction.

SUMMARY OF THE INVENTION

The present invention fulfills the above-described and other needs by providing noise reduction techniques in which spectral subtraction filtering is performed in sample-wise fashion in the time domain using a time-domain representation of a spectral subtraction gain function computed in block-wise fashion in the frequency domain. By continuously performing time-domain filtering on a sample by sample basis, the disclosed methods and apparatus can avoid the block-processing delays associated with frequency-domain based spectral subtraction systems. As a result, the disclosed methods and apparatus are particularly well suited for applications requiring very short processing delays. Moreover, since the spectral subtraction gain function is computed in a block-wise fashion in the frequency domain (e.g., using the techniques of the above incorporated co-pending application Ser. Nos. 09/084,387 and 09/084,503), high quality performance in terms of reduced tonal artifacts and low signal distortion is retained. In applications where only stationary, low-energy background noise is present, computational complexity can be reduced by generating a number of separate spectral subtraction gain functions during an initialization period, each gain function being suitable for one of several predefined classes of input signal (e.g., for one of several predetermined signal energy ranges), and thereafter fixing the several gain functions until the input signal characteristics change.

In an exemplary embodiment, a noise reduction processor includes a time-domain filter configured to convolve a noisy input signal with a time-domain spectral subtraction gain function to provide a noise reduced output signal, a spectral subtraction gain function processor configured to compute a frequency-domain spectral subtraction gain function as a function of the noisy input signal, and a transform processor configured to provide the time-domain spectral subtraction gain function by transforming the frequency-domain spectral subtraction gain function, wherein said spectral subtraction gain function processor selects the frequency-domain spectral subtraction gain function from a number of available spectral subtraction gain functions. For example, the spectral subtraction gain function processor can generate the available spectral subtraction gain functions during an initialization period and then fix the available spectral subtraction gain functions after the initialization period. Consequently, an instantaneous spectral subtraction gain function need not be continually re-computed after initialization.

According to exemplary embodiments, each of the available spectral subtraction gain functions corresponds to one of a number of possible classifications of the noisy input signal. For example, the noisy input signal can be classified as having a measured energy level falling within one of a number of predefined energy-level ranges. Additionally, the available spectral subtraction gain functions can be periodically re-generated after the initialization period, or when a character of a noise component of the noisy input signal changes. A determination as to whether the character of the noise component has changed can be made by measuring an estimate of a spectral content of the noise component (e.g., at pseudo-random intervals).

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

DETAILED DESCRIPTION OF THE INVENTION

Figure 1:
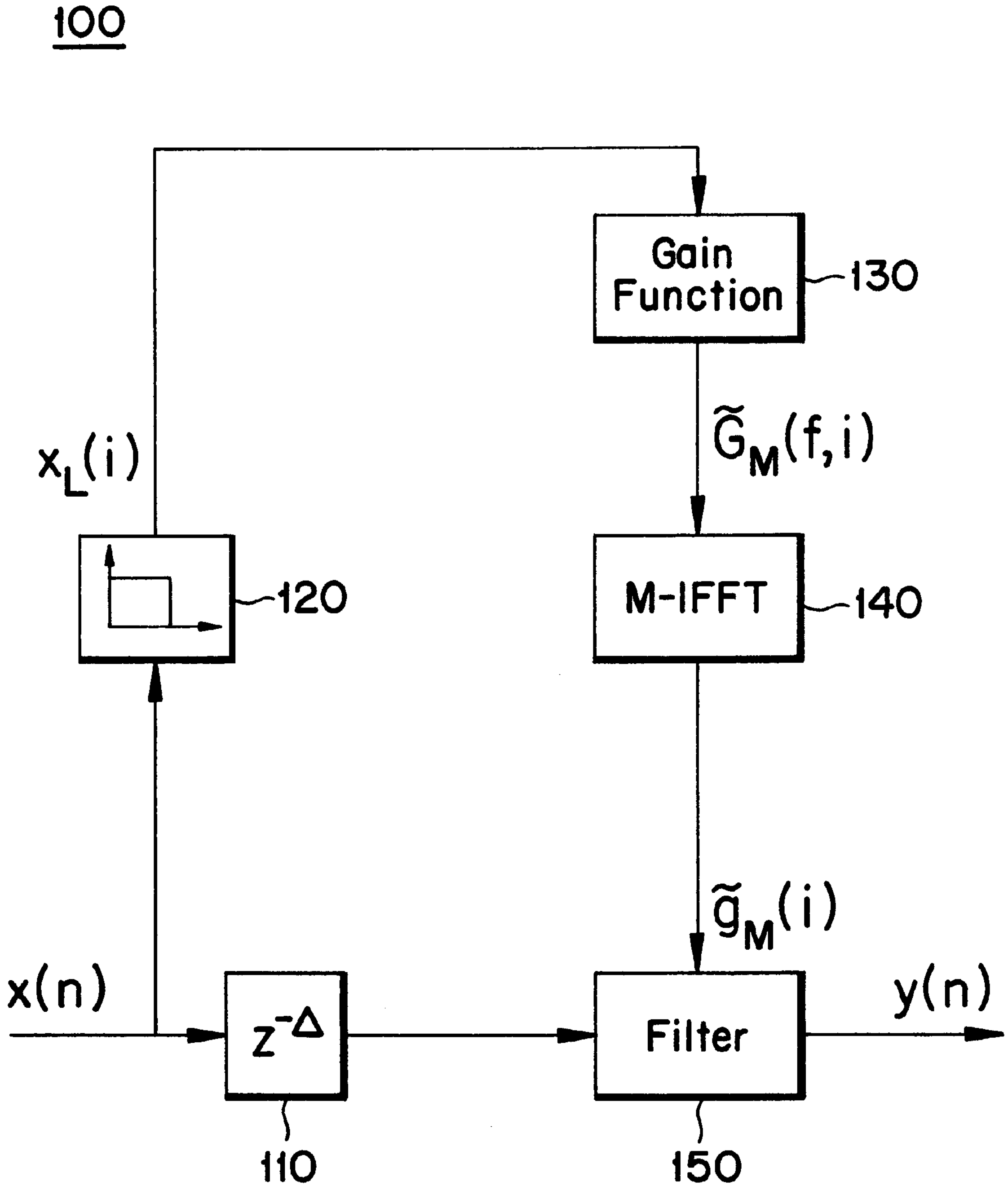
FIG. 1 is a block diagram of an exemplary noise reduction system according to the invention.

FIG. 1 depicts an exemplary noise reduction system 100 according to the present invention. As shown, the exemplary system 100 includes a delay buffer 110, a frame buffer 120, a frequency-domain spectral subtraction gain function processor 130, an Inverse Fast Fourier Transform (IFFT) processor 140, and a time-domain spectral subtraction filter 150. Those of skill in the art will appreciate that the below described functionality of the various blocks of the system 100 of FIG. 1 can be implemented in practice using any of a variety of known hardware configurations, including a general purpose digital computer, standard digital signal processing components and one or more application specific integrated circuits.

In FIG. 1, a noisy speech signal x(n) is coupled to an input of the delay buffer 110 and to an input of the frame buffer 120. An output of the delay buffer 110 is coupled to a signal input of the time-domain spectral subtraction filter 150, and an output of the frame buffer 120 is coupled to a signal input of the frequency-domain gain function processor 130. An output of the gain function processor 130 is coupled to an input of the IFFT processor 140, and an output of the IFFT processor 140 is coupled to a gain function input of the time-domain filter 150. The filter 150 provides a noise-suppressed speech signal y(n).

In operation, successive samples of the noisy speech signal x(n) (e.g., a near-end microphone signal including near-end background noise) are fed to the delay buffer 110 and to the frame buffer 120. The frame buffer 120 collects the incoming samples and passes them, a frame at a time, to the gain function processor 130 (where a frame is understood to be a collection of an integer number L of consecutive signal samples). Additionally, the delay buffer 110 introduces an adjustable delay of zero to L samples and passes the delayed samples, one at a time, to the time-domain spectral subtraction filter 150. The spectral subtraction filter 150 continually convolves the delayed samples with a prevailing time-domain spectral subtraction gain function $\tilde{g}_M(i)$ (where M is an integer sub-frame length and i is an integer frame count as described in detail below) to provide the noise-reduced speech signal y(n). The M-sample time-domain gain function $\tilde{g}_M(i)$ can therefore be thought of as the impulse response of the time-domain filter 150, as is well known in the art.

According to the invention, the time-domain gain function $\tilde{g}_M(i)$ is computed on a per-frame basis by the gain function processor 130 and the IFFT processor 140. More specifically, for each frame i, the gain function processor 130 uses the frame samples $x_L(i)$ to compute an M-bin frequency-domain spectral subtraction gain function $\tilde{G}_M(f,i)$ (as is described in detail below), and the IFFT processor 140 converts the frequency-domain gain function $\tilde{G}_M(f,i)$ to a corresponding time-domain gain function $\tilde{g}_M(i)$ which is then used to update the impulse response of the time-domain filter 150 (i.e., the previously existing filter coefficients $\tilde{g}_M(i-1)$ are replaced with the newly computed coefficients $\tilde{g}_M(i)$). However, since the filter 150 continually operates on noisy speech samples using the prevailing gain function, the signal delay between the noise-suppressed output y(n) and the noisy input x(n) is determined only by the delay buffer 110 and the filter 150, and not by the frame buffer 120, the gain function processor 130 or the IFFT processor 140.

The above described operation of the exemplary system 100 of FIG. 1 can be contrasted with operation of spectral subtraction systems (such as those described in the above incorporated patent application Ser. Nos. 09/084,387 and 09/084,503) in which filtering is carried out in the frequency domain. In such systems, a frequency-domain representation of a frame of noisy speech samples is multiplied by a frequency-domain gain function (corresponding to convolution in the time domain) to provide a frequency-domain representation of the noise-reduced output signal which is then converted back to the time domain. As a result, the delay between corresponding samples of the noisy speech signal x(n) and the noise-reduced output signal y(n) is as much as one frame period (since all samples in an input frame are processed together to provide a corresponding output frame) plus the overall frame processing time (i.e., the time required to convert a frame of noisy speech samples from the time domain to the frequency domain, then compute the frequency-domain gain function, carry out the frequency-domain multiplication, and convert the result back to the time domain).

Advantageously, the exemplary system of FIG. 1 permits the signal delay to be set for best results given a particular application. For example, in applications where signal delay is less critical, the delay buffer 110 can be set to introduce a delay of one frame period so that each sample of the noisy speech signal x(n) is filtered using a gain function computed based on that sample. Doing so renders operation of the system 100 of FIG. 1 equivalent to that of the above incorporated application Ser. Nos. 09/084,387 and 09/084,503 and provides optimal sound quality. Alternatively, in applications where short signal delay is critical, the delay buffer 110 can be set to introduce little or no delay so that each sample of the noisy speech signal x(n) is filtered using a gain function computed based on recently preceding samples. Though sound quality may be slightly diminished, extremely short signal delay is achieved. The trade-off between sound quality and signal delay will be a matter of design choice for each particular application.

To ensure that the time-domain filtering performed by the filter 150 is equivalent to frequency-domain filtering, care must be taken when constructing the frequency-domain spectral subtraction gain function $\tilde{G}_M(f,i)$. Appropriate methods for constructing the frequency-domain gain function (i.e., for implementing the gain function processor 130 of FIG. 1) are described in detail in the above incorporated application Ser. Nos. 09/084,387 and 09/084,503. Briefly, spectral subtraction is built upon the assumption that the speech signal and the background noise signal are random, uncorrelated, and added together to form the noisy speech signal x(n). In other words, if s(n), w(n) and x(n) are stochastic short-time stationary processes representing speech, noise, and noisy speech, respectively, then:

$$x(n)=s(n)+w(n)$$

and $$R_x(f)=R_s(f)+R_w(f),$$

where $f\in[0, N-1]$ is a discrete variable corresponding to one frequency bin, and $R_{(\cdot)}(f)$ denotes the power spectral density of a random process.

The short-time spectral density is then estimated using, for example, the well known Bartlett method as follows:

$$\hat{R}_{x,M}(f,i)=\frac{M}{L}\sum_{p=0}^{\frac{L}{M}-1}|\mathcal{F}\{x_{L,p}(i)\}|^2,$$

where $X_{L,p}(i)$ is the ith L-length frame with sub-frames p of M data samples each. This method of computation reduces the variance as well as the frequency resolution of the resulting spectrum. In practice, the trade off between variance reduction and resolution is a matter of design choice, and experiments have shown that a resolution of M=64 frequency bins typically provides quality results.

To simplify notation, $$P_{x,M}(f,i)=\sqrt{\hat{R}_{x,M}(f,i)}$$

is defined as the magnitude spectrum estimate. The short-time noise magnitude spectrum can thus be estimated during speech pauses by $$\overline{P}_{w,M}(f,i)=\begin{cases}\mu\overline{P}_{w,M}(f,i-1)+(1-\mu)P_{w,M}(f,i), & \text{noise}\\ \overline{P}_{w,M}(f,i-1), & \text{speech,}\end{cases}$$

where $\mu$ is an exponential averaging time constant. To detect speech pauses, a Voice Activity Detector (VAD) can be used, as is well known in the art.

The expression for the frequency-domain gain function is then given by $$G_M(f,i)=\left(1-k\cdot\frac{\overline{P}^a_{w,M}(f,i)}{P^a_{w,M}(f,i)}\right)^{\frac{1}{a}},$$

where k controls the degree of subtraction and a controls whether magnitude or power spectral subtraction is used. The combination of the parameters k and a thus controls the amount of noise reduction.

To further reduce the variability of the gain function, the raw frequency-domain gain function $G_M(f,i)$ can be adaptively averaged to yield a smoothed frequency-domain gain function $\overline{G}_M(f,i)$. For example, the adaptation can be made dependent upon a spectral discrepancy between the noise spectra and the noisy speech spectra. Doing so tends to increase the averaging as the input signal becomes more stationary and thereby provides reduced variability of the gain function for stationary noise and low energy speech.

To facilitate a causal filter with a short delay, a minimum phase can be imposed on the calculated zero-phase gain function $\overline{G}_M(f,i)$ to yield the final frequency-domain gain function $\tilde{G}_M(f,i)$ . This can be implemented, for example, using a Hilbert transform relation. See, for example, A. V. Oppenheim and R. W. Schafer, Discrete-Time Signal Processing, *Prentice-Hall*, Inter. Ed., 1989.

Figure 2:
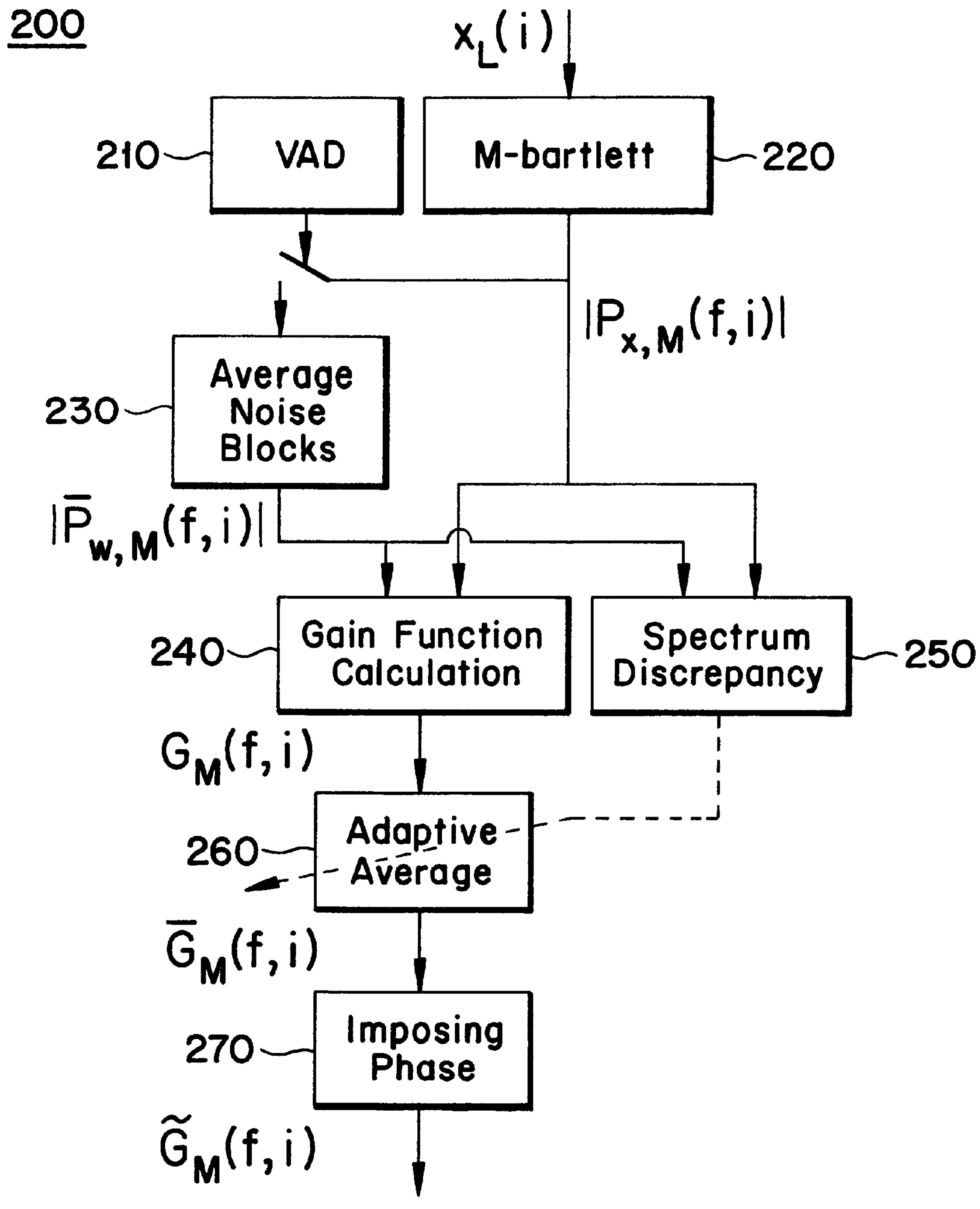
FIG. 2 is a block diagram of an exemplary spectral subtraction gain function processor which can be used in the system of FIG. 1.

The above described computation of the frequency-domain gain function $\tilde{G}_M(f,i)$ is depicted in FIG. 2, wherein an exemplary frequency-domain gain function processor 200 is shown to include a voice activity detector 210, a spectrum estimation processor 220, a noise averaging processor 230, a frequency-domain gain function calculation processor 240, a spectrum discrepancy analyzer 250, an adaptive averaging processor 260, and a phase processor 270. The exemplary gain function processor 200 of FIG. 2 can be used, for example, to implement the frequency-domain gain function processor 130 of FIG. 1. Those of skill in the art will appreciate that the below described functionality of the various blocks of the system 200 of FIG. 2 can be implemented in practice using any of a variety of known hardware configurations, including a general purpose digital computer, standard digital signal processing components and one or more application specific integrated circuits.

In FIG. 2, a frame of noisy speech samples is input to the spectrum estimation processor 220, and an output of the spectrum estimation processor 220 is switchably coupled to an input of the noise averaging processor 230 under the control of the voice activity detector 210. The output of the spectrum estimation processor 220 is also coupled to an input of each of the gain function calculation processor 240 and the spectrum discrepancy processor 250, as is an output of the noise averaging processor 230. Outputs of the gain function calculation processor 240 and the spectrum discrepancy processor 250 are coupled to respective inputs of the adaptive averaging processor 260, and an output of the adaptive averaging processor 260 is coupled to an input of the phase processor 270. The phase processor 270 provides the frequency-domain gain function (e.g., for input to the IFFT processor 140 of FIG. 1).

In operation, the spectrum estimation processor 220 generates an M-length estimate $\overline{P}_{x,M}(f,i)$ of the spectral density of the ith frame of the noisy speech signal x(n). Additionally, during speech pauses, the voice activity detector 210 couples the output of the spectrum estimation processor 220 to the noise averaging processor 230, and the noise averaging processor averages (e.g., using exponential averaging) the noisy speech spectrum estimate. Since, during speech pauses, the output of the spectrum estimation processor 220 is an estimate of the spectral density of the noise alone, the noise averaging processor 230 provides an averaged estimate $\overline{P}_{w,M}(f,i)$ of the spectral density of the background noise w(n).

The gain function calculation processor 240 then uses both the noisy speech spectrum estimate $\overline{P}_{x,M}(f,i)$ and the averaged noise spectrum estimate $\overline{P}_{w,M}(f,i)$, in conjunction with the empirically determined parameters a and k defined above, to compute the raw frequency-domain gain function $G_M(f,i)$. Additionally, the spectrum discrepancy processor 250 determines a degree of difference between the spectrum estimates $\overline{P}_{x,M}(f,i)$, $\overline{P}_{w,M}(f,i)$, the degree of difference being used by the adaptive averaging processor 260 to average (e.g., using exponential averaging with a variable memory) the raw gain function $G_M(f,i)$ to provide the averaged, or smoothed gain function $\overline{G}_M(f,i)$ (see the above incorporated application Ser. Nos. 09/084,387 and 09/084,503 for additional detail regarding the implementation and advantages of gain function averaging based on spectral discrepancy). Thereafter, the phase processor 270 imposes a minimum phase on the averaged gain function $\overline{G}_M(f,i)$ to provide the final frequency-domain gain function $\tilde{G}_M(f,i)$ (again, see the above incorporated application Ser. Nos. 09/084,387 and 09/084,503 for additional detail regarding the implementation and advantages of imposing gain function phase).

Once the final frequency-domain gain function $\tilde{G}_M(f,i)$ has been computed, it is transformed (e.g., by the IFFT processor 140 of FIG. 1) to provide an updated time-domain gain function $\tilde{g}_M(i)$ (e.g., for the filter 150 of FIG. 1). As noted above, the noise-reduced output signal y(n) is obtained by convolving the noisy input signal x(n) with the prevailing time-domain gain function $\tilde{g}_M(i)$ as:

$$y(n) = \sum_{m=0}^{M-1} x(n-m)\cdot\tilde{g}_{M,m}(i).$$

Empirical studies have shown that the observed filtering delay is typically in the range of 0 to 8 samples, where the delay is defined as the mass center of the filter along the time axis (since a group delay measure cannot be used for broadband speech signals). Parameter settings of k=0.7, a=1, L=256 and M=64 provide noise reduction of approximately 10 dB.

Although the above described technique is not computationally complex, further reductions in complexity can be realized in situations where only relatively low-energy noise is expected. In particular, when a stationary low-energy noise is disturbing the speech signal, empirical studies have shown that only a small number of fixed gain functions are required to provide good speech quality. In other words, one of a finite number of gain functions, each gain function being specifically tailored for one of an equal number of predefined signal classes (e.g., based on signal energy levels corresponding to high-energy vocal sounds, fricatives, stop sounds, etc.), can be dynamically selected based on a determination of the prevailing signal class. Consequently, continual re-computation of the filter gain function can be avoided. Advantageously, the present invention provides methods and apparatus for establishing, or extracting, suitable sets of fixed filter gain functions.

Generally, the above described gain function computation techniques are used, during a processor initialization period, to generate the fixed filter gain functions. More specifically, for each frame during the initialization period, the noisy speech signal is classified, and a gain function assigned for use by that signal class is trained, or updated (e.g., by exponential averaging with a gain function computed as described above). At the end of the initialization period (e.g., when small iterative changes indicate that the gain function assigned to each class has reached a reasonably steady state), the gain functions are frozen and thereafter selectively used to filter the noisy speech signal. In other words, for each post-initialization frame, the noisy speech signal is classified, and the corresponding fixed filter gain function is used to filter the noisy speech.

Advantageously, the fixed filter gain functions need be re-trained, or re-extracted, only when the signal characteristics change (i.e., when the background noise changes). Such noise changes can be detected during speech pauses by pseudo random tests of the spectral shape of the noise (e.g., by monitoring changes in the amplitude spectral estimate of the noise). Alternatively, the fixed filters can be re-extracted by resuming averaging when too great a discrepancy is detected between the presently selected fixed gain function and a dynamically computed gain function (e.g., computed using the above described techniques). Moreover, the fixed filters can be re-extracted by resuming the averaging function at some predetermined or variable rate (e.g., so many instances per second).

Signal classification can be carried out in a number of ways. For example, the noisy speech signal can be classified as belonging to one of several predefined energy-level regions. If so, the energy level e(n) of the noisy speech signal x(n) can be calculated using an exponential averaging as follows:

$$e(n)=e(n-1)\cdot\gamma+x(n)^2\cdot(1-\gamma),$$

where $\gamma$ is the averaging time constant or memory. The signal energy class $e_{class}(n)$ can then be determined as $$e_{class}(n) = \begin{cases} 1, & e(n) < e_{level}(0) \\ 2, & e_{level}(0) < e(n) < e_{level}(1) \\ \ldots & \\ T, & e_{level}(T-1) < e(n) \end{cases}$$

During initialization, each per-class gain function $\overline{G}_M(f,t,i)(t\epsilon[0, T])$ can then be averaged in the frequency domain as $$\overline{G}_M(f,t,i)=\overline{G}_M(f,t,i-1)\cdot\delta_t+G_M(f,i)\cdot(1-\delta_t),$$

where $\delta_t$ is the per-class averaging time constant and $G_M(f,i)$ is the raw frequency-domain gain function described above.

After initialization, a specific fixed filter $\overline{G}_M(f,t,i)$ is selected when the signal class it was designed for is detected. To minimize the delay of the filtering, a minimum phase is imposed on the filter, as described above, to provide a final frequency-domain filter $\tilde{G}_M(f,i)$. The final frequency-domain filter $\tilde{G}_M(f,i)$ is converted to the time domain to provide the desired time-domain filter $\tilde{g}_M(i)$.

Figure 3:
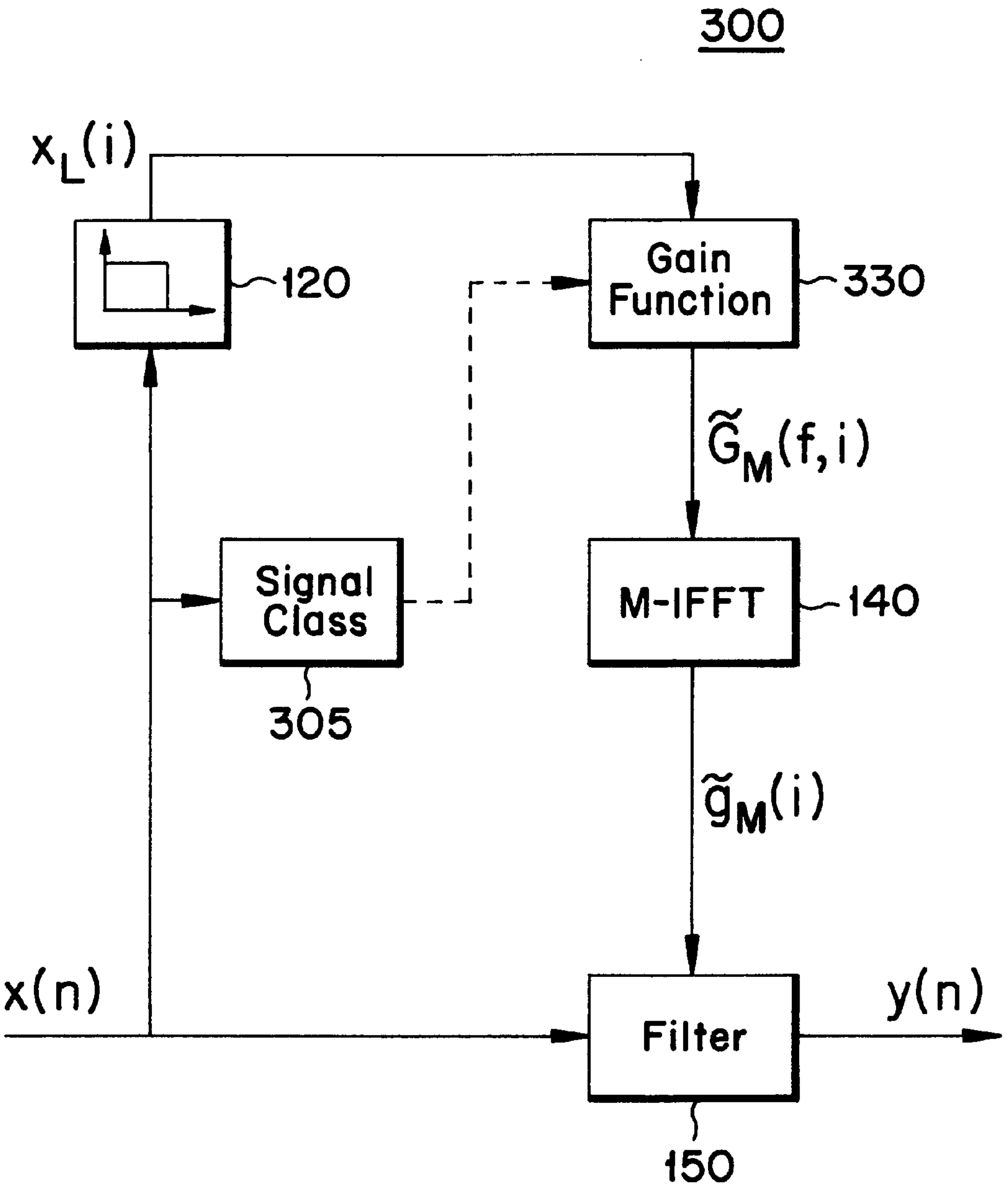
FIG. 3 is a block diagram of an alternative noise reduction system according to the invention.

The above described fixed-filter techniques can be implemented, for example, using the exemplary noise reduction system 300 of FIG. 3. As shown, the system 300 includes the frame buffer 120, the IFFT processor 140, and the time-domain spectral subtraction filter 150 of FIG. 1, as well as a signal classification processor 305 and an alternative spectral subtraction gain function processor 330. Those of skill in the art will appreciate that the below described functionality of the various blocks of the system 300 of FIG. 3 can be implemented in practice using any of a variety of known hardware configurations, including a general purpose digital computer, standard digital signal processing components and one or more application specific integrated circuits.

In FIG. 3, the noisy speech signal x(n) is coupled to an input of each of the frame buffer 120, the signal classification processor 305, and the time-domain filter 150. Outputs of the frame buffer 120 and the signal classification processor 305 are coupled to inputs of the alternative gain function processor 330, and an output of the gain function processor 330 is coupled to an input of the IFFT processor 140. An output of the IFFT processor 140 is coupled to a gain function input of the time-domain filter 150, and the time-domain filter 150 provides the noise suppressed output signal y(n).

At a high level, the system 300 of FIG. 3 works much like the system 100 of FIG. 1. Specifically, the time-domain filter 150 continually processes samples of the noisy speech signal, while the frame buffer 120 collects noisy speech samples and passes them, one frame at a time, to the gain function processor 330. The gain function processor 330 computes a frequency-domain gain function $\tilde{G}_M(f,i)$ in frame-wise fashion, and the IFFT processor 140 transforms the frequency-domain gain function to provide a time-domain gain function $\tilde{g}_M(i)$ which is used to update the taps of time-domain filter 150. Unlike the system 100 of FIG. 1, however, the system 300 of FIG. 3 uses the signal classification processor 305 to determine which of several predefined classes best describes the current noisy speech sample (e.g., according to the above described energy-level classification scheme). The signal classification processor 305 then provides a class number (i.e., $t\epsilon[0, T]$) to the gain function processor 330 for use in frame-wise computing the frequency-domain gain function $\tilde{G}_M(f,i)$ as described above (i.e., by extracting T fixed filters during an initialization period and thereafter selecting the appropriate one of the T fixed filters based upon the output of the signal classification processor).

Figure 4:
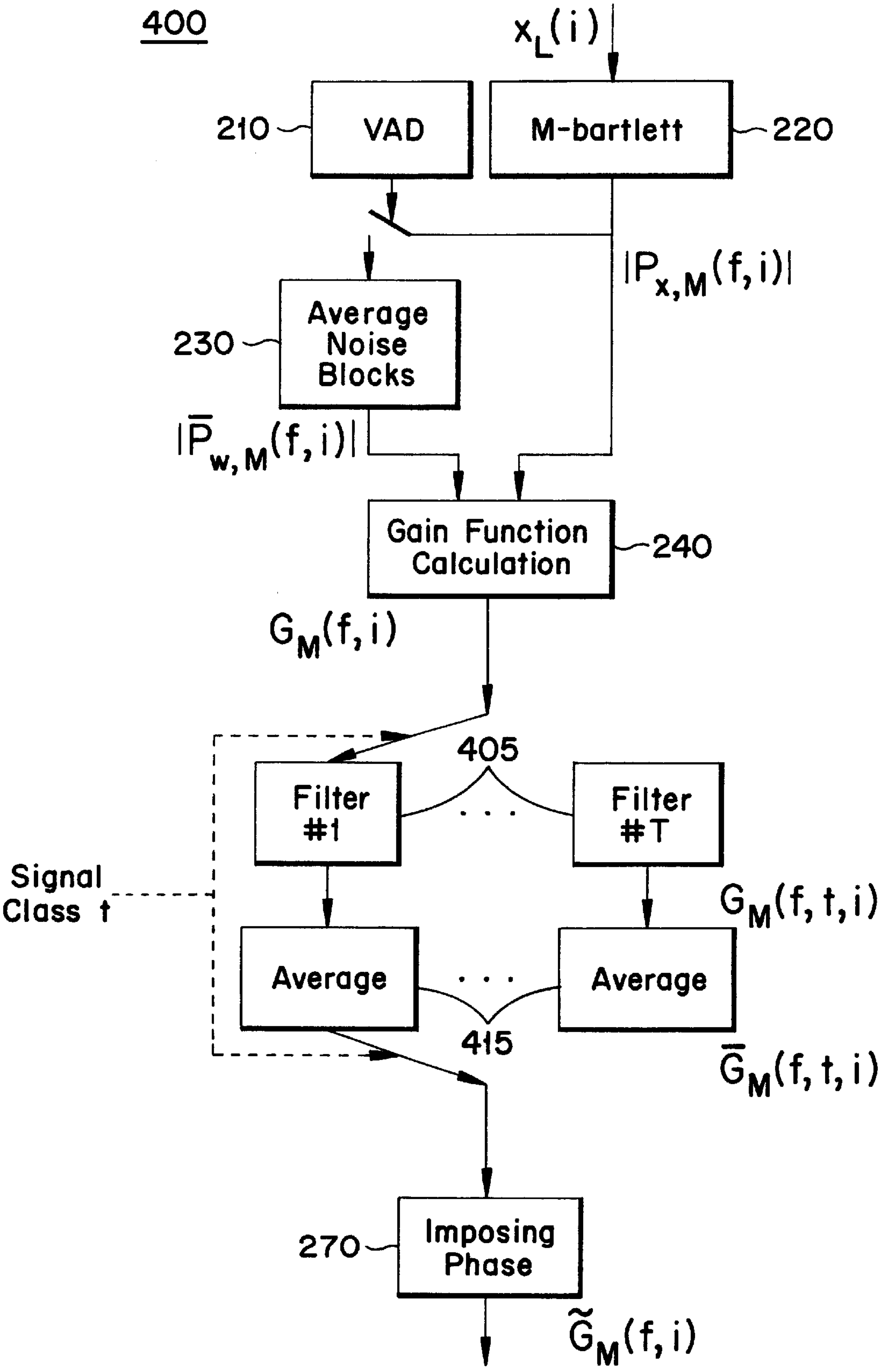
FIG. 4 is a block diagram of an exemplary gain function processor which can be used in the system of FIG. 3.

FIG. 4 depicts an exemplary frequency-domain gain function processor 400 which can be used to implement the gain function processor 330 of FIG. 3. As shown, the processor 400 includes the voice activity detector 210, the spectrum estimation processor 220, the noise averaging processor 230, the gain function calculation processor 240, and the phase processor 270 of FIG. 2, as well as a number of filter extractors 405 and an equal number of filter averaging processors 415. Those of skill in the art will appreciate that the below described functionality of the various blocks of the system 400 of FIG. 4 can be implemented in practice using any of a variety of known hardware configurations, including a general purpose digital computer, standard digital signal processing components and one or more application specific integrated circuits.

In FIG. 4, a frame of noisy speech samples is coupled to an input of the spectrum estimation processor 220, and an output of the spectrum estimation processor 220 is switchably coupled to an input of the noise averaging processor 230 under the control of the voice activity detector 210. The output of the spectrum estimation processor 220 is also coupled to an input of the gain function calculation processor 240, as is an output of the noise averaging processor 230. Output of the gain function calculation processor 240 is switchably coupled to one of the several filter extractors 405 (e.g., in dependence upon the output of the signal classification processor 305 of FIG. 3), and an output of each of the filter extractors 405 is coupled to an input of a respective one of the several averaging processors 415. Input of the phase processor 270 is selectively coupled to an output of one of the averaging processors 415 (e.g., also in dependence upon the output of the signal classification processor 305 of FIG. 3), and the phase processor 270 provides a frequency-domain gain function as output.

In operation, the voice activity detector 210, the spectrum estimation processor 220, the noise averaging processor 230, and the gain function calculation processor 240 function as described above with respect to the system 200 of FIG. 2. However, in the system 400 of FIG. 4, spectrum-dependent exponential gain function averaging is not used to smooth the raw frequency-domain gain function across frames. Instead, the instantaneous frequency-domain gain function $G_M(f,i)$ is used during initialization to update a selected one (e.g., as indicated by the signal class number t provided by the signal classification processor 305) of the per-class gain functions 405 as is described above.

Specifically, the averaging processor 415 associated with the selected filter 405 exponentially averages the instantaneous frequency-domain gain function $G_M(f,t,i)$ with the previously existing selected-filter gain function $\overline{G}_M(f,t,i-1)$ to provide an updated selected-filter gain function $\overline{G}_M(f,t,i)$. Thus, at the end of the initialization period, the processor 400 has extracted T fixed filter gain functions $\overline{G}_M(f,t,i)$ and further updating is frozen unless the character of the background noise changes. After initialization, the appropriate fixed-filter gain function $\overline{G}_M(f,t,i)$ is merely selected in accordance with the signal class number provided by the signal classification processor 305.

During and after initialization, the phase processor 270 adds a minimum phase, as described above with respect to FIG. 2, to provide the final frequency-domain gain function $\tilde{G}_M(f,i)$. The final frequency-domain gain function $\tilde{G}_M(f,i)$ is then transformed (e.g., by the IFFT processor 140 of FIG. 3) to provide the updated time-domain gain function $\tilde{g}_M(i)$ (e.g., for the filter 150 of FIG. 3). As before, the noise-reduced output signal y(n) is obtained by convolving the noisy speech signal x(n) with the prevailing time-domain gain function $\tilde{g}_M(i)$, and the signal delay between input and output is low (typically about 8 samples).

Generally, the present invention provides methods and apparatus for performing short-delay noise suppression by spectral subtraction. In exemplary embodiments, signal filtering is performed in sample-wise fashion in the time-domain using a time-domain representation of a spectral subtraction gain function which is computed in frame-wise fashion in the frequency domain. A minimum phase is imposed on the frequency-domain gain function, prior to conversion to the time domain, so that the corresponding time-domain gain function is causal and introduces a minimal filtering delay. The result is good sound-quality noise reduction with a typical signal-to-noise (SNR) improvement of approximately 10 dB and a typical introduced delay of approximately 8 samples. Such delay is well within the range of allowable delays in wire-line telephone systems. Computational complexity can be reduced in low-energy, long-time stationary noise environments by extracting and utilizing a set of fixed filters. In such case, the signal-to-noise improvement is typically on the order of 6–10 dB, with a good sound quality, and the introduced delay is again on the order of 8 samples.

Those skilled in the art will appreciate that the invention is not limited to the specific exemplary embodiments which have been described herein for purposes of illustration and that numerous alternative embodiments are also contemplated. For example, although the invention has been described in the context of hands-free telephony applications, those skilled in the art will appreciate that the teachings of the invention are equally applicable in any signal processing application in which it is desirable to suppress a particular signal component. The scope of the invention is therefore defined by the claims appended hereto, rather than the foregoing description, and all equivalents consistent with the meaning of the claims are intended to be embraced therein.

We claim:

1. A noise reduction processor, comprising:

a time-domain filter configured to convolve a noisy input signal with a time-domain spectral subtraction gain function to provide a noise reduced output signal;

a spectral subtraction gain function processor configured to compute a frequency-domain spectral subtraction gain function as a function of the noisy input signal; and a transform processor configured to provide the time-domain spectral subtraction gain function by transforming the frequency-domain spectral subtraction gain function, wherein said spectral subtraction gain function processor selects the frequency-domain spectral subtraction gain function from a number of available spectral subtraction gain functions.

2. A noise reduction processor according to claim 1, wherein said spectral subtraction gain function processor generates the available spectral subtraction gain functions during an initialization period.

3. A noise reduction processor according to claim 2, wherein said spectral subtraction gain function processor fixes the available spectral subtraction gain functions after the initialization period.

4. A noise reduction processor according to claim 1, wherein each of the available spectral subtraction gain functions corresponds to one of a number of possible classifications of the noisy input signal.

5. A noise reduction processor according to claim 4, wherein the noisy input signal is classified according to a measured energy level of the noisy input signal.

6. A noise reduction processor according to claim 5, wherein the noisy input signal is classified as having a measured energy level falling within one of a number of predefined energy-level ranges.

7. A noise reduction processor according to claim 1, wherein said spectral subtraction gain function processor periodically generates the available spectral subtraction gain functions during each of a plurality of initialization periods, and wherein further:

each of the initialization periods is followed by a corresponding post-initialization period; and for each of the initialization periods, the spectral subtraction gain function processor fixes the available spectral subtraction gain functions for use during the corresponding post-initialization period.

8. A noise reduction processor according to claim 1, wherein:

said spectral subtraction gain function processor generates the available spectral subtraction gain functions during an initialization period;

said spectral subtraction gain function processor holds the available spectral subtraction gain functions fixed for use during a post-initialization period; and said spectral subtraction gain function processor thereafter re-generates the available spectral subtraction gain functions only when a character of a noise component of the noisy input signal changes, wherein each of the re-generated available spectral subtraction gain functions is held fixed for use during a corresponding post-re-generation period.

9. A noise reduction processor according to claim 8, wherein a determination as to whether the character of the noise component has changed is made by measuring an estimate of a spectral content of the noise component.

10. A noise reduction processor according to claim 9, wherein the spectral content of the noise component is tested at pseudo-random intervals.

11. A method for suppressing a noise component of a communications signal, comprising the steps of:

convolving the communications signal with a time-domain spectral subtraction gain function to provide a noise suppressed output signal;

selecting a frequency-domain spectral subtraction gain function from a number of available spectral subtraction gain functions in dependence upon a value of the communications signal; and transforming the selected frequency-domain spectral subtraction gain function to provide the time-domain spectral subtraction gain function.

12. A method according to claim 11, further comprising the step of generating the available spectral subtraction gain functions during an initialization period.

13. A method according to claim 12, further comprising the step of fixing the available spectral subtraction gain functions after the initialization period.

14. A method according to claim 11, further comprising the step of classifying the noisy input signal, wherein each of the available spectral subtraction gain functions corresponds to one of a number of possible classifications of the noisy input signal.

15. A method according to claim 14, wherein the noisy input signal is classified according to a measured energy level of the noisy input signal.

16. A method according to claim 15, wherein the noisy input signal is classified as having a measured energy level falling within one of a number of predefined energy-level ranges.

17. A method according to claim 11, further comprising the steps of:

periodically generating the available spectral subtraction gain functions during each of a plurality of initialization periods, wherein each of the initialization periods is followed by a corresponding post-initialization period; and for each of the initialization periods, fixing the available spectral subtraction gain functions for use during the corresponding post-initialization period.

18. A method according to claim 11, further comprising the steps of:

generating the available spectral subtraction gain functions during an initialization period;

holding the available spectral subtraction gain functions fixed for use during a post-initialization period; and re-generating the available spectral subtraction gain functions only when a character of a noise component of the noisy input signal changes, wherein each of the re-generated available spectral subtraction gain functions is held fixed for use during a corresponding post-re-generation period.

19. A method according to claim 18, wherein a determination as to whether the character of the noise component has changed is made by monitoring an estimate of a spectral content of the noise component.

20. A method according to claim 19, wherein the spectral content of the noise component is tested at pseudo-random intervals.

21. A telephone, comprising:

a microphone receiving near-end sound and providing a corresponding near-end signal; and a spectral subtraction processor configured to suppress a noise component of the near-end signal, said spectral subtraction processor including a time-domain filter configured to convolve the near-end signal with a time-domain spectral subtraction gain function to provide a noise-reduced near-end signal, a spectral subtraction gain function processor configured to select a frequency-domain spectral subtraction gain function from a number of available spectral subtraction gain functions, and a transform processor configured to provide the time-domain spectral subtraction gain function by transforming the frequency-domain spectral subtraction gain function.

22. A telephone according to claim 21, wherein said spectral subtraction gain function processor generates the available spectral subtraction gain functions during an initialization period.

23. A telephone according to claim 22, wherein said spectral subtraction gain function processor fixes the available spectral subtraction gain functions after the initialization period.

24. A telephone according to claim 21, wherein each of the available spectral subtraction gain functions corresponds to one of a number of possible classifications of the near-end signal.

25. A telephone according to claim 24, wherein the near-end signal is classified according to a measured energy level of the near-end signal.

26. A telephone according to claim 25, wherein the near-end signal is classified as having a measured energy level falling within one of a number of predefined energy-level ranges.

27. A telephone according to claim 21, wherein said spectral subtraction gain function processor periodically generates the available spectral subtraction gain functions during each of a plurality of initialization periods, and wherein further:

each of the initialization periods is followed by a corresponding post-initialization period; and for each of the initialization periods, the spectral subtraction gain function processor fixes the available spectral subtraction gain functions for use during the corresponding post-initialization period.

28. A telephone according to claim 21, wherein:

said spectral subtraction gain function processor generates the available spectral subtraction gain functions during an initialization period;

said spectral subtraction gain function processor holds the available spectral subtraction gain functions fixed for use during a post-initialization period; and said spectral subtraction gain function processor thereafter re-generates the available spectral subtraction gain functions only when a character of the noise component of the near-end signal changes, wherein each of the re-generated available spectral subtraction gain functions is held fixed for use during a corresponding post-re-generation period.

29. A telephone according to claim 28, wherein a determination as to whether the character of the noise component has changed is made by monitoring an estimate of a spectral content of the noise component.

30. A telephone according to claim 29, wherein the spectral content of the noise component is tested at pseudo-random intervals.

* * * * *